(12) United States Patent
Connor et al.

(10) Patent No.: US 7,294,161 B2
(45) Date of Patent: Nov. 13, 2007

(54) FILTER WITH ROTATIONAL END CAP BASE RETENTION

(75) Inventors: Michael J. Connor, Stoughton, WI (US); Michael R. Furseth, Cambridge, WI (US)

(73) Assignee: Fleetguard, Inc., Nashville, TN (US)

( * ) Notice: Subject to any disclaimer, the term of this patent is extended or adjusted under 35 U.S.C. 154(b) by 366 days.

(21) Appl. No.: 10/935,300

(22) Filed: Sep. 7, 2004

(65) Prior Publication Data

US 2005/0235620 A1    Oct. 27, 2005

Related U.S. Application Data

(63) Continuation-in-part of application No. 10/690,144, filed on Oct. 21, 2003, now Pat. No. 7,063,730.

(51) Int. Cl.
*B01D 46/00* (2006.01)
(52) U.S. Cl. .................... 55/498; 55/506; 210/DIG. 17
(58) Field of Classification Search .................. 55/490, 55/385.3, 498, 505, 506, 507, 511; 210/232, 210/448, DIG. 17
See application file for complete search history.

(56) References Cited

U.S. PATENT DOCUMENTS

| | | | |
|---|---|---|---|
| 3,187,714 A | 6/1965 | Flanigan | |
| 3,732,667 A | 5/1973 | Fromknecht et al. | |
| 3,796,027 A | 3/1974 | Gumtow | |
| 4,006,000 A | 2/1977 | Tortorici et al. | |
| 4,204,960 A | 5/1980 | Sugiyama et al. | |
| 4,386,949 A | 6/1983 | Bassi | |
| 4,514,875 A | 5/1985 | Comer | |
| 4,692,177 A | 9/1987 | Wright et al. | |
| 4,838,901 A | 6/1989 | Schmidt et al. | |
| 4,950,317 A | 8/1990 | Dottermans | |
| 4,955,996 A | 9/1990 | Edwards et al. | |
| 5,045,192 A * | 9/1991 | Terhune ...................... | 210/232 |
| 5,295,602 A | 3/1994 | Swanson | |
| 5,865,863 A | 2/1999 | DeSousa et al. | |
| 5,882,367 A | 3/1999 | Morgan et al. | |
| 6,017,379 A | 1/2000 | Kauffman | |
| 6,056,799 A | 5/2000 | Unrath et al. | |
| 6,093,231 A | 7/2000 | Read et al. | |
| 6,120,685 A * | 9/2000 | Carlson et al. ............. | 210/232 |
| 6,231,630 B1 | 5/2001 | Ernst et al. | |
| 6,299,661 B1 | 10/2001 | Bloomer | |
| 6,334,887 B1 | 1/2002 | Coulonvaux | |
| 6,425,930 B1 | 7/2002 | Wake et al. | |

(Continued)

FOREIGN PATENT DOCUMENTS

WO    WO 01/25105    4/2001

*Primary Examiner*—Frank M. Lawrence
(74) *Attorney, Agent, or Firm*—Andrus, Sceales, Starke & Sawall, LLP; J. Bruce Schelkope

(57) ABSTRACT

A filter includes a filter element mounted to a base and having first and second end caps spaced axially along an axis. Fluid to be filtered flows laterally through the filter element and axially through a hollow interior and through an axial flow opening of the second end cap. The filter element is mounted to the base solely by the second end cap in rotational relationship independently of the first end cap, eliminating the third component traditionally needed for mounting a housing cover to the base and enclosing and/or sealing and/or retaining the filter element in the housing.

3 Claims, 14 Drawing Sheets

U.S. PATENT DOCUMENTS

| | | |
|---|---|---|
| 6,436,162 B1 | 8/2002 | Wake et al. |
| 6,440,188 B1 | 8/2002 | Clements et al. |
| 6,569,219 B1 | 5/2003 | Connor et al. |
| 6,626,973 B2 | 9/2003 | Park |
| 6,790,251 B1 | 9/2004 | Brady, Jr. |
| 2001/0037969 A1 | 11/2001 | Stankowski |
| 2002/0069625 A1 | 6/2002 | Stass |

* cited by examiner

US 7,294,161 B2

FILTER WITH ROTATIONAL END CAP BASE RETENTION

CROSS-REFERENCE TO RELATED APPLICATION

This application is a continuation-in-part of U.S. patent application Ser. No. 10/690,144, filed Oct. 21, 2003, now U.S. Pat. No. 7,063,730.

BACKGROUND AND SUMMARY

The invention relates to filters, including air filters, and more particularly to a low cost mounting and retention system.

An air filter traditionally includes three components, namely: (1) a filter element; (2) a housing base; and (3) a housing cover mounted to the base and enclosing and/or sealing and/or retaining the filter element in the housing. The parent invention of the noted '144 application eliminates the need for the third component, and makes the use of a cover optional. In the preferred embodiment, the noted parent invention eliminates the need for the third component by directly attaching/retaining and sealing the first component to the second component, independently of the third component (the cover). The parent invention is particularly useful as an intake air cleaner for internal combustion engines.

The present invention arose during continuing development efforts related to the noted parent invention, and provides a further mounting and retention system.

BRIEF DESCRIPTION OF THE DRAWINGS

Parent Application

FIG. 1 is a side elevation view of a filter in accordance with the '144 application.

FIG. 2 is an enlarged sectional view of a portion of FIG. 1 as shown at line 2-2.

FIG. 3 is like FIG. 1 and shows another embodiment.

FIG. 4 is an enlarged sectional view of a portion of FIG. 3 as shown at line 4-4.

FIG. 5 is an exploded perspective view of another embodiment.

FIG. 6 is a perspective assembly view of the filter of FIG. 5.

FIG. 7 is a sectional view taken along line 7-7 of FIG. 6.

FIG. 8 is a perspective view showing an alternate embodiment of a portion of FIG. 6.

FIG. 9 is a sectional view taken along line 9-9 of FIG. 8.

FIG. 10 is an exploded perspective view of another embodiment.

FIG. 11 is a perspective assembly view of the filter of FIG. 10.

FIG. 12 is a sectional view taken along line 12-12 of FIG. 11.

Present Invention

Figure 13:
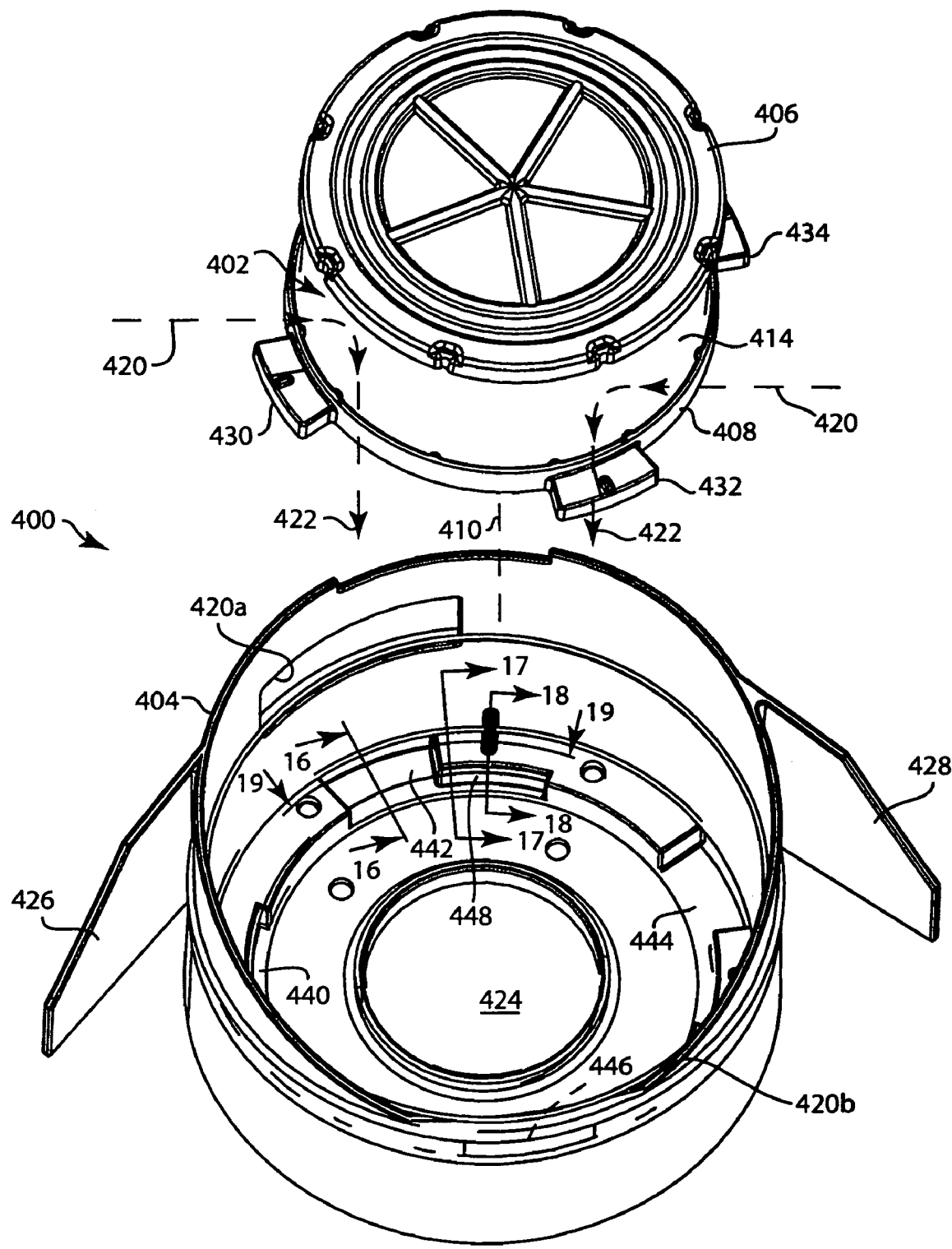

FIG. 13 is an exploded perspective view of a filter in accordance with the present invention.

Figure 14:
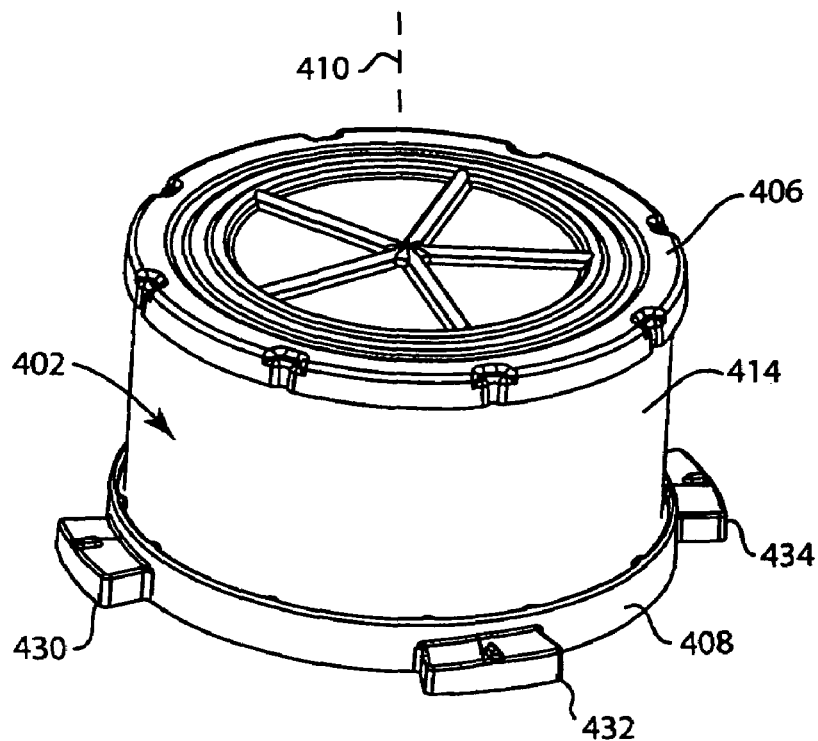

FIG. 14 is a perspective view of the filter element of FIG. 13.

Figure 15:
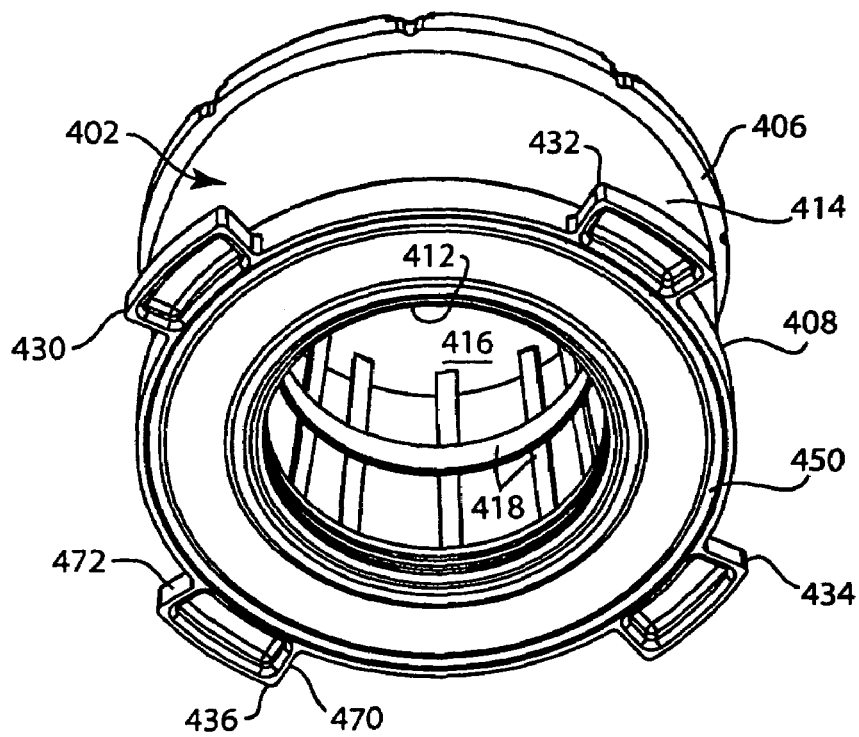

FIG. 15 is a perspective view from below of the filter element of FIG. 13.

Figure 16:
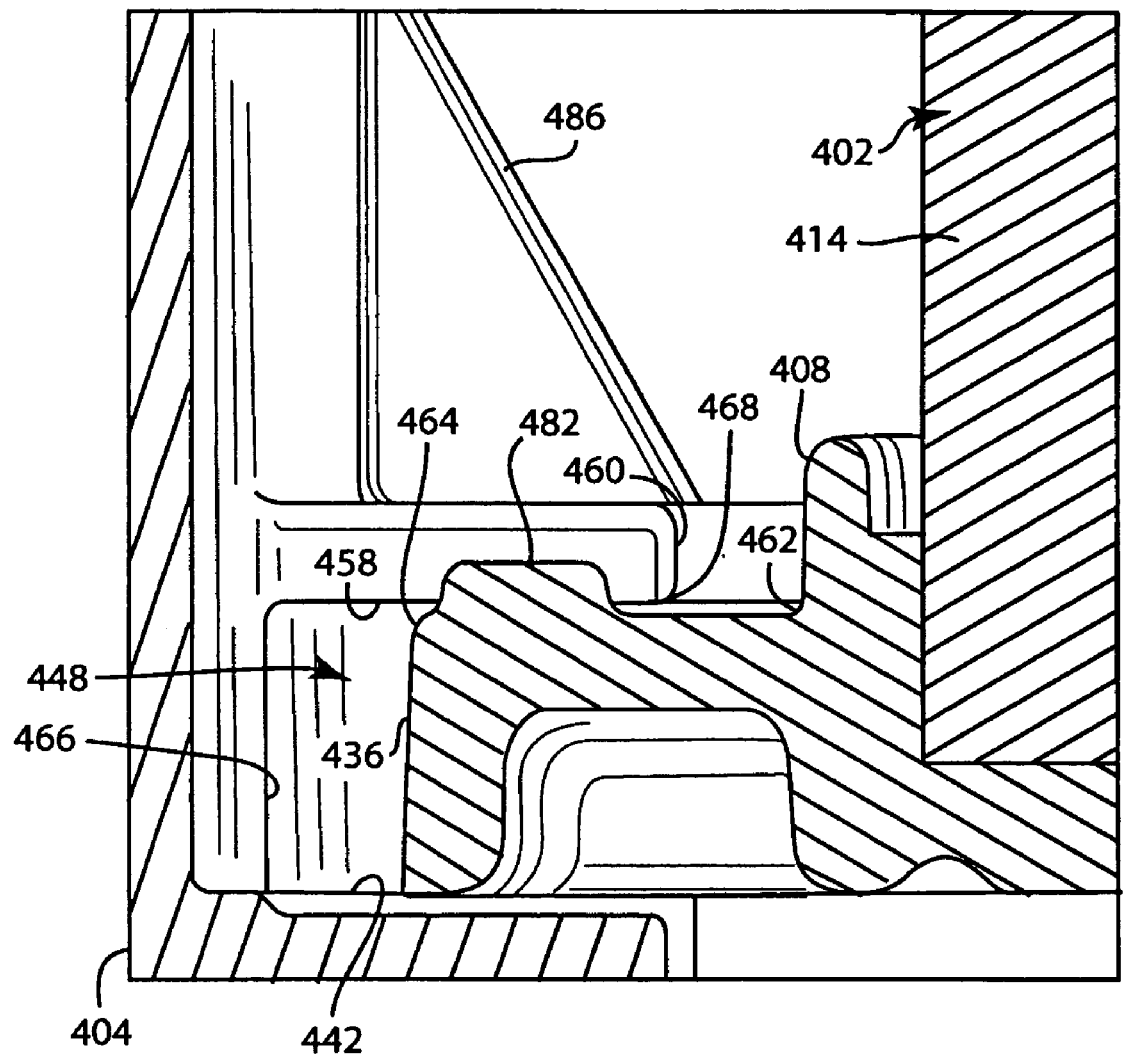

FIG. 16 is a sectional view of the filter of FIG. 13 in assembled condition taken along line 16-16 of FIG. 13.

Figure 17:
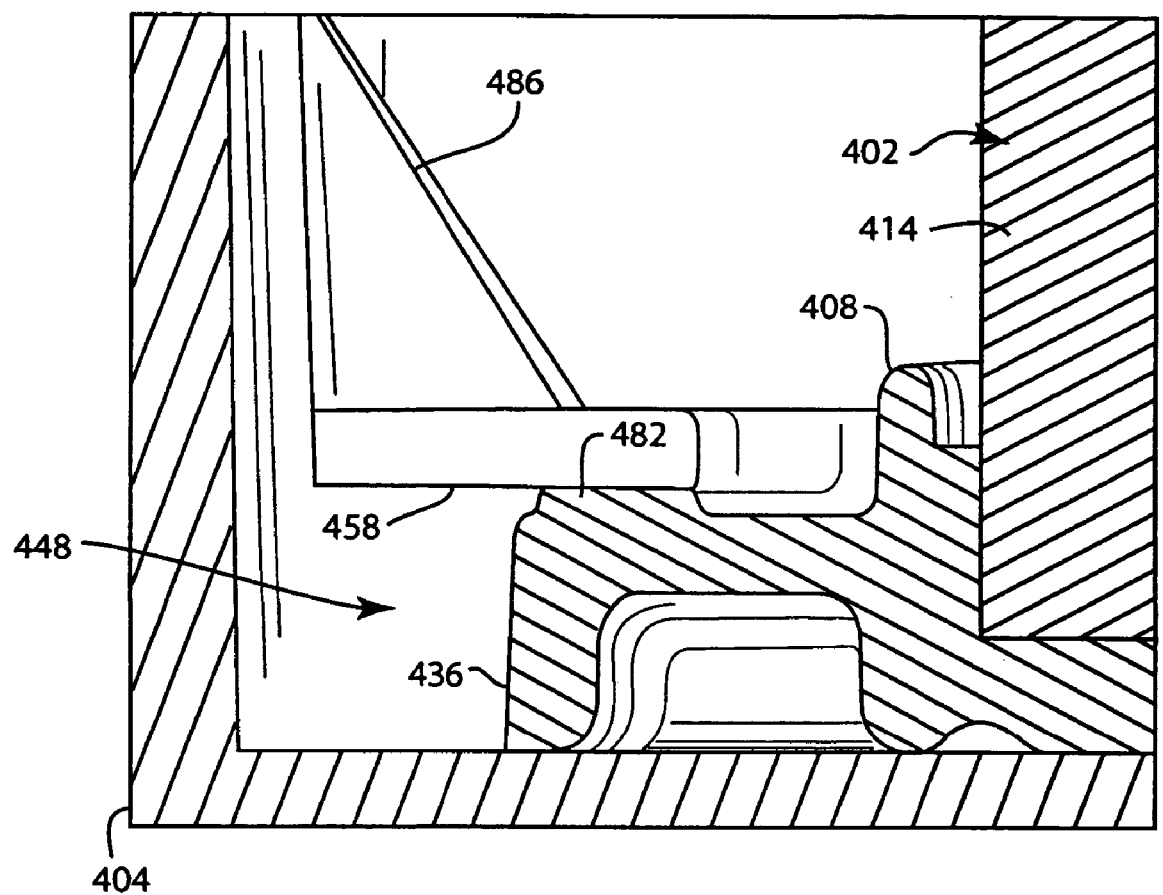

FIG. 17 is like FIG. 16 but taken along line 17-17 of FIG. 13.

Figure 18:
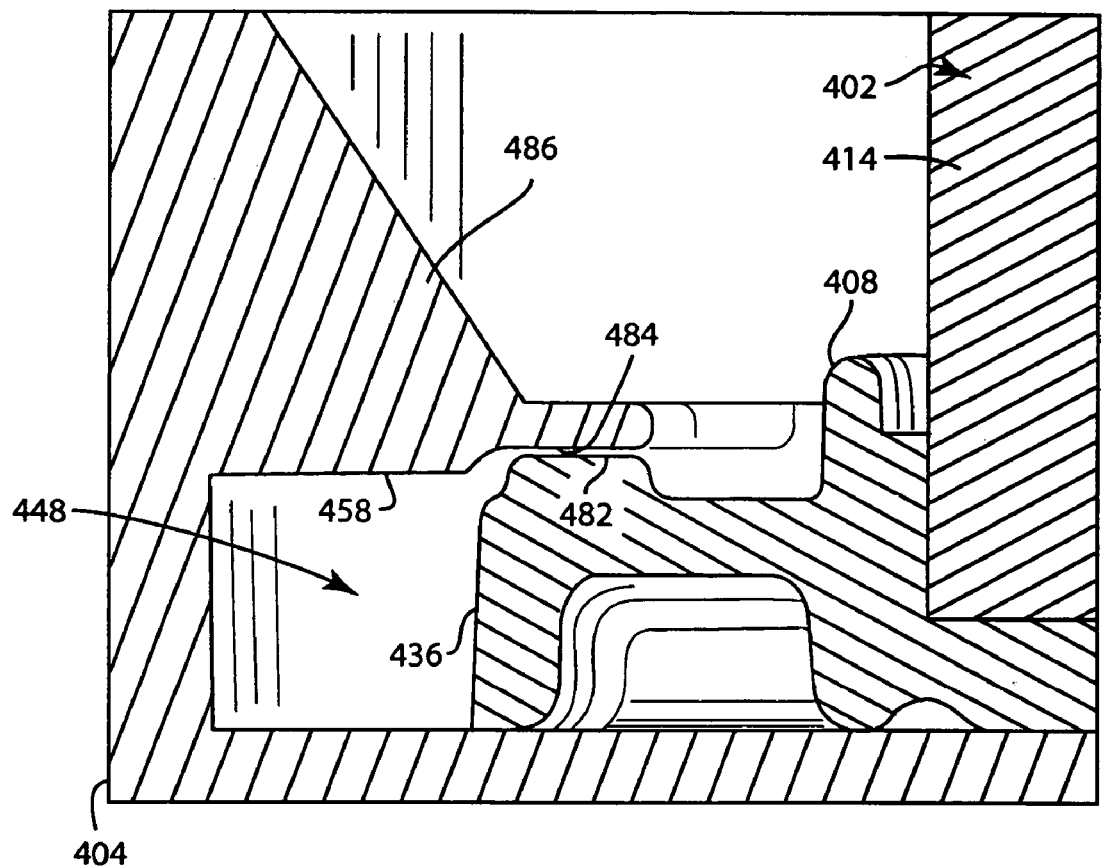

FIG. 18 is like FIG. 16 but taken along line 18-18 of FIG. 13.

Figure 19:
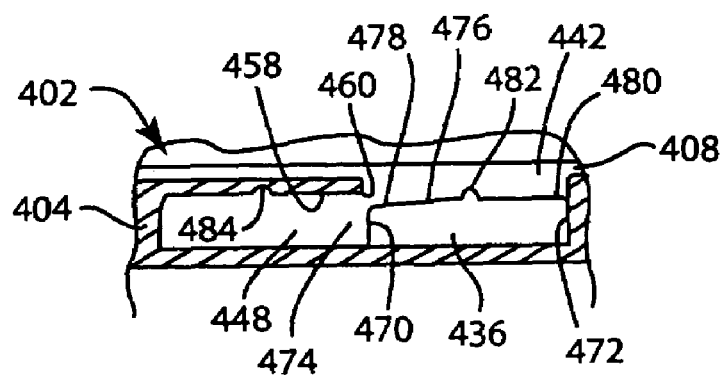

FIG. 19 is a sectional view of a portion of the filter of FIG. 13 in assembled condition taken along line 19-19 of FIG. 13.

Figure 20:
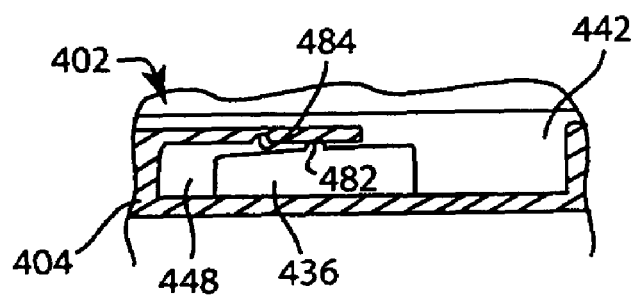

FIG. 20 is like FIG. 19 and illustrates a further sequential mounting position.

Figure 21:
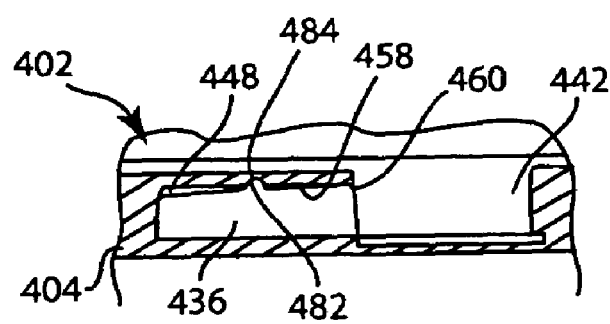

FIG. 21 is like FIG. 20 and shows a further sequential mounting position.

Figure 22:
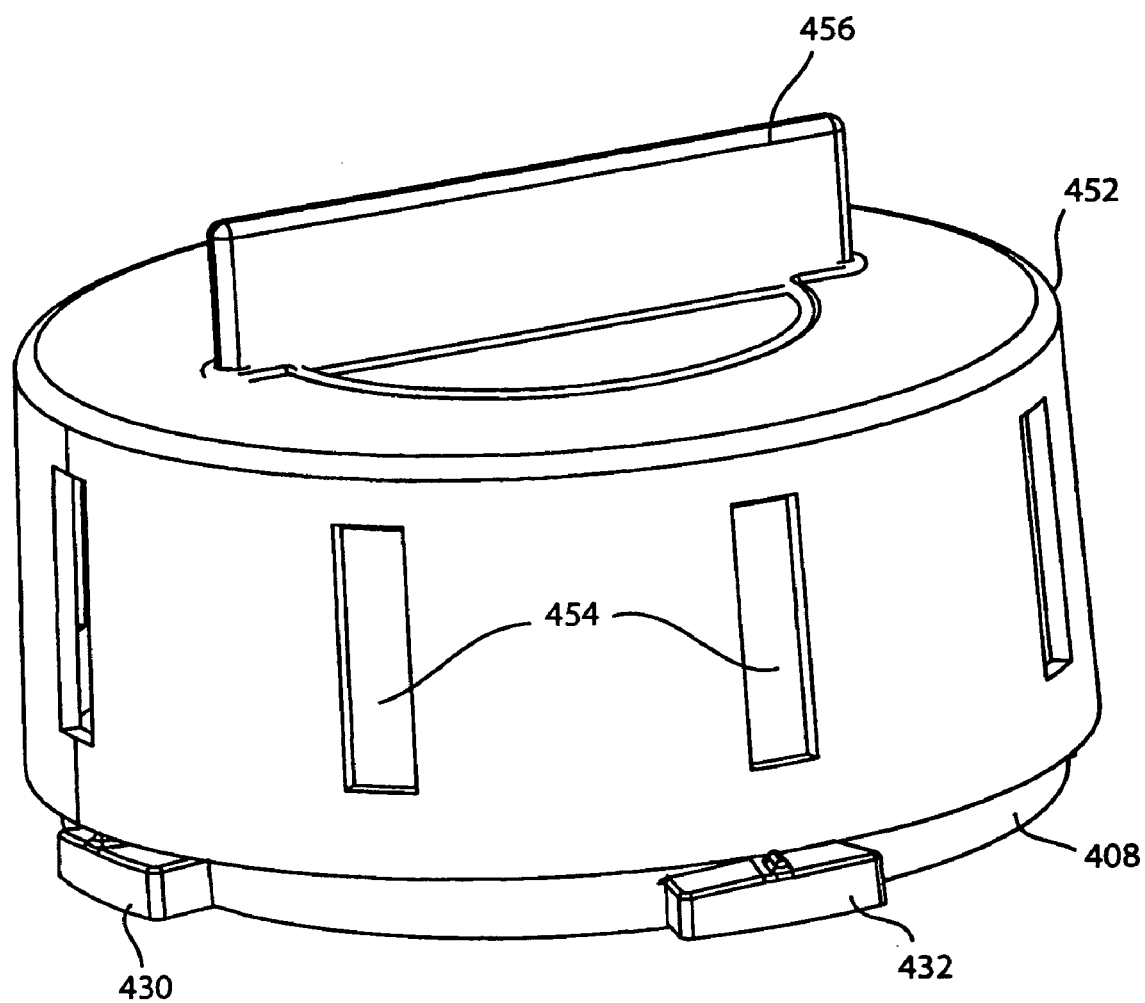

FIG. 22 is a perspective view of the filter element of FIG. 13 and shows a further embodiment.

DETAILED DESCRIPTION

Patent Application

The following description of FIGS. 1-12 is taken from the noted parent '144 application.

Figure 1:
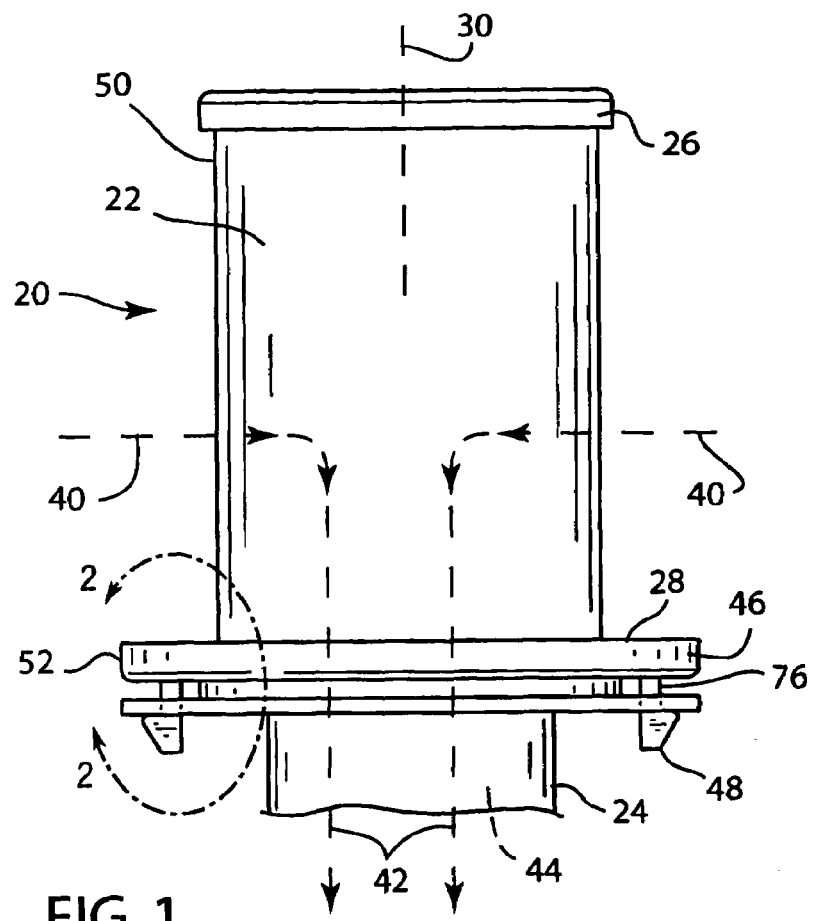
FIGS. 1-12 are taken from the noted parent '144 application.

FIG. 1 shows a filter 20 including a filter element 22 mounted to a base 24. Filter element 22 has first and second end caps 26 and 28 axially spaced along an axis 30. End cap 28 has an axial flow opening 30 therethrough, FIG. 2. The filter element includes filter media 32, which may be pleated, FIG. 5, and which may have an outer liner 34 and/or an inner liner 36, FIG. 2, extending axially between end caps 26 and 28 and extending in a closed-loop, e.g. a circular annulus, an oval, a racetrack shape, etc., around a perimeter defining a hollow interior 38 communicating with axial flow opening 30. End caps 26 and 28 are preferably plastic, and filter media 32 is preferably embedded or potted therein in accordance with known embedding/dispensing technology. Fluid to be filtered flows laterally through the filter media, as shown at dashed line arrows 40, FIGS. 1, 2, and axially, as shown at dashed arrows 42, through hollow interior 38 and axial flow opening 30 into interior passage 44 in base 24 for delivery to the air intake of an internal combustion engine (not shown). Upper end cap 26 is a closed end cap spanning and closing hollow interior 38 of filter element 22. Filter element 22 is mounted to base 24 by end cap 28. The filter element is mounted to the base solely by end cap 28 and independently of end cap 26. A retainer, to be described, co-acts between end cap 28 and base 24 and applies axial retention force therebetween independently of end cap 26, and independently of any cover forming a housing with the base and around the filter element.

Figure 2:
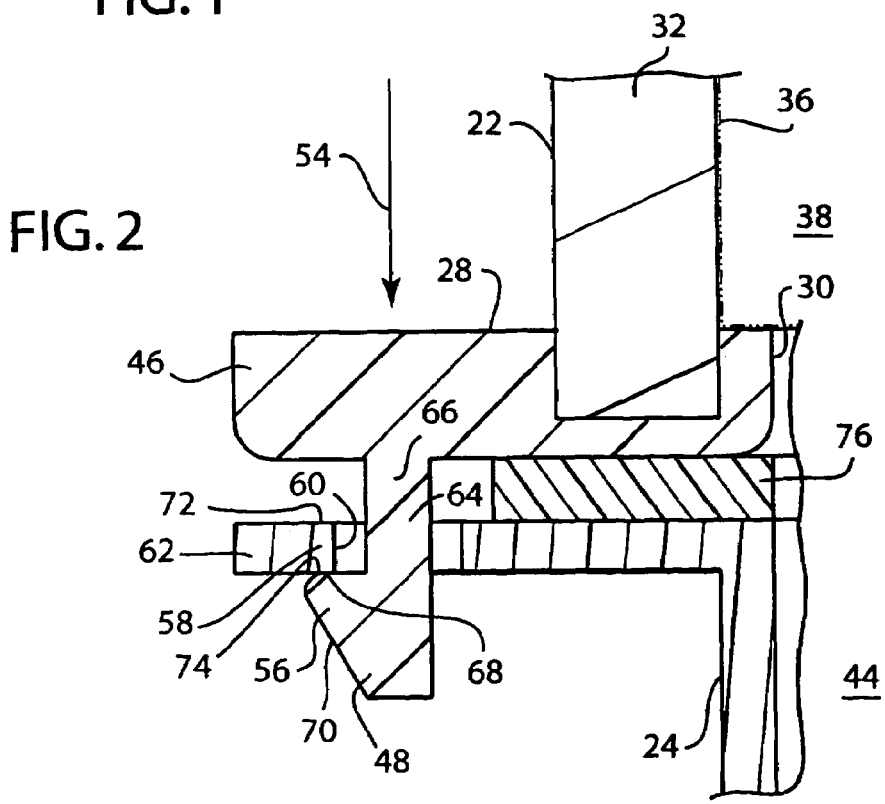

End cap 28 extends laterally outwardly to an outer flange 46 laterally outward of filter media 32. A retainer 48 on outer flange 46 mounts filter element 22 at end cap 28 to base 24. Filter media 32 has an outer border 50, FIG. 1. Outer flange 46 has an outer border 52 laterally outward of outer border 50 and sufficiently laterally extended therefrom to accommodate retainer 46 along the lateral dimension between outer borders 50 and 52. Retainer 48 mounts end cap 28 to base 24 in snap-fit relation with rectilinearly unidirectional axial insertion as shown at arrow 54, FIG. 2. In FIG. 2, the retainer is provided by a hook 56 on end cap 28, and a catch 58 on base 24 as provided by a slot or opening 60 in a flange 62 extending laterally from the base. Hook 56 is on a shank 64 which extends axially from a partially flexible hinge on end cap 28. Hook 56 is laterally moveable about hinge 66 toward and away from the edge of slot or opening 60 of base 24 and into and out of engagement with catch 58.

Hook 56 has oppositely axially facing surfaces 68 and 70. Catch 58 has oppositely axially facing surfaces 72 and 74. End cap 28 is mounted to base 24 with axial insertion motion 54 wherein surfaces 70 and 72 are camming surfaces and engage in camming relation to cam hook 56 laterally in a first lateral direction (rightwardly in FIG. 2) until surface 68 moves axially past surface 74, whereupon hook 56 snaps back laterally in a second lateral direction (leftwardly in FIG. 2) opposite to the noted first lateral direction such that surface 68 axially aligns with and axially engages surface 74 and prevents axial separation of end cap 28 from base 24, i.e. prevents upward movement of end cap 28 in FIGS. 1 and 2. Surface 68 faces axially toward hinge 66. Surface 70 faces axially away from hinge 66. Surface 74 faces axially away from hinge 66. Surface 72 faces axially toward end cap 26. Surface 74 faces axially away from end cap 26. Hook 56 is manually laterally moveable in the noted first lateral direction (rightwardly in FIG. 2) about hinge 66, e.g. by grasping the hook with the fingers of a technician and pinching the hook laterally inwardly, to move surface 68 laterally inwardly out of axial alignment with and out of axial engagement with surface 74, to release hook 56 from catch 58 and permit axial separation of end cap 28 and base 24, i.e. axial upward movement of end cap 28 in FIG. 2. Surface 72 faces axially toward hinge 66. End caps 26 and 28 and base 24 are preferably plastic, and hinge 66 is a living hinge. If desired, an axial sealing gasket 76 is provided between base 24 and end cap 28 and retained in sealing relation by the retainer provided by hook 56 and catch 58.

Figure 3:
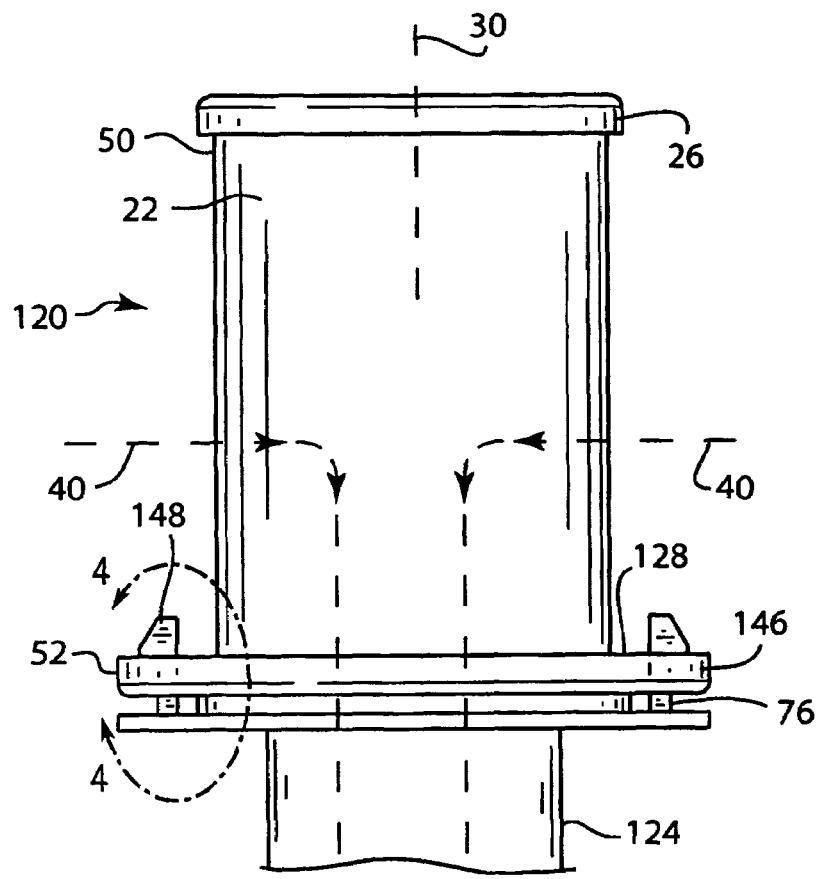
Figure 4:
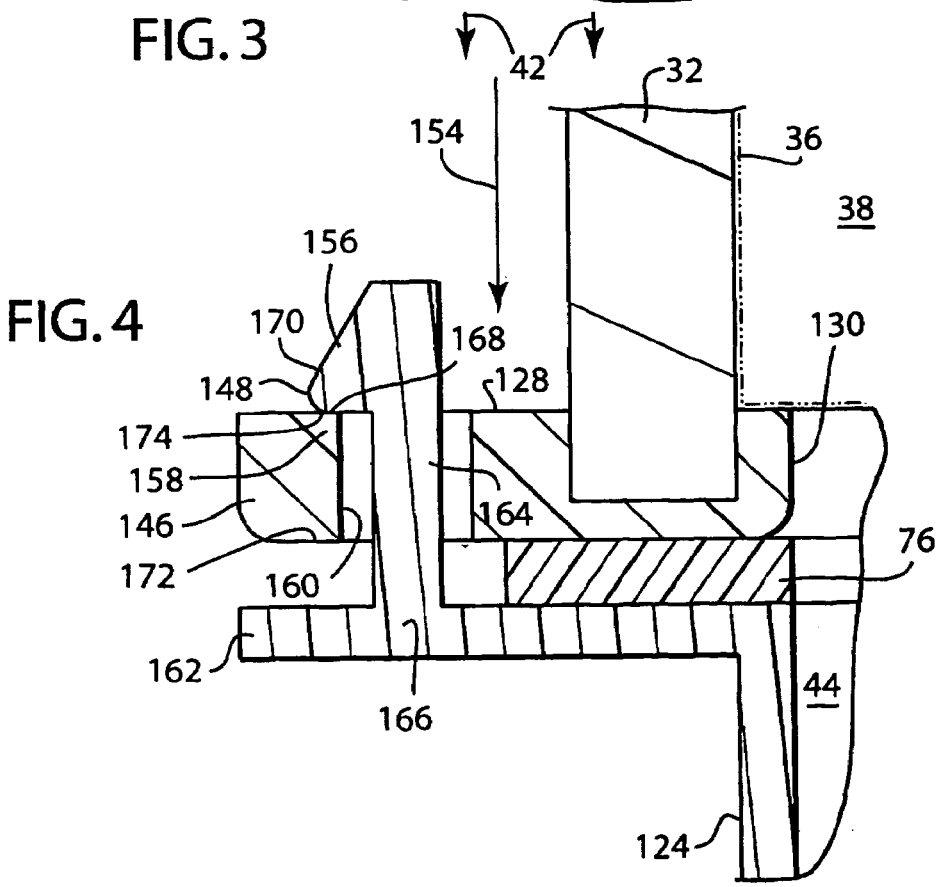

FIGS. 3 and 4 show another embodiment and use like reference numerals from above where appropriate to facilitate understanding. Filter 120 includes filter element 22 mounted to base 124 and having end caps 26 and 128 spaced axially along axis 30. End cap 128 has an axial flow opening 130 therethrough. Filter media 32 extends axially between end caps 26 and 128 and extends in a closed-loop around a perimeter defining hollow interior 38 communicating with axial flow opening 130. Fluid to be filtered flows laterally through filter media 32 as shown at dashed arrows 40, and axially as shown at dashed arrows 42 through hollow interior 38 and axial flow opening 130. Filter element 120 is mounted to base 124 by end cap 128. Filter element 120 is mounted to base 124 solely by end cap 128, independently of end cap 26. A retainer, to be described, co-acts between end cap 128 and base 124 and applies axial retention force therebetween, independently of end cap 26, and independently of any cover forming a housing with the base and around the filter element.

End cap 128 extends laterally outwardly to an outer flange 146 laterally outward of filter media 32. A retainer 148 mounts the filter element at end cap 128 to base 124. Filter media 32 has the noted first outer border 50. Outer flange 146 has the noted second outer border 52 laterally outward of outer border 50 and sufficiently laterally extended therefrom to accommodate retainer 148 along the lateral dimension between first and second outer borders 50 and 52. Retainer 148 mounts end cap 128 to base 124 in snap-fit relation with rectilinearly unidirectional axial insertion 154. Retainer 148 is provided by a hook 156 on laterally extended flange 162 of base 124, and a catch 158 on laterally extended flange 146 of end cap 128. Hook 156 is on a shank 164 which extends axially from a hinge 166 of base 124. Hook 156 is laterally moveable about hinge 166 toward and away from the edge of slot or opening 160 of end cap 128 into and out of engagement with catch 158.

Hook 156 has oppositely axially facing surfaces 168 and 170. Catch 158 has oppositely axially facing surfaces 172 and 174. End cap 128 is mounted to base 124 with axial insertion motion 154. Surfaces 170 and 172 are camming surfaces and engage in camming relation to cam hook 156 laterally in a first lateral direction (rightwardly in FIG. 4) until surface 168 moves axially past surface 172, whereupon hook 156 snaps back laterally in a second lateral direction (leftwardly in FIG. 4) opposite to the noted first lateral direction, such that surface 168 axially aligns with and axially engages surface 174 and prevents axial separation of end cap 128 and base 124, i.e. prevents axial upward movement of end cap 128 in FIG. 4. Surface 168 faces axially toward hinge 166. Surface 170 faces axially away from hinge 166. Surface 172 faces axially away from end cap 26. Surface 174 faces axially toward end cap 26. Hook 156 is manually laterally moveable in the noted first lateral direction (rightwardly in FIG. 4, e.g. by manual engagement and pinching by the fingers of the operator) about hinge 166 to move surface 168 laterally rightwardly in FIG. 4 out of axial alignment with and out of axial engagement with surface 174, to release hook 156 from catch 158 and permit axial separation of end cap 128 and base 124, i.e. upward axial movement of end cap 128 in FIG. 4. End caps 26 and 128 and base 124 are preferably plastic, and hinge 166 is preferably a spring lever.

Figure 5:
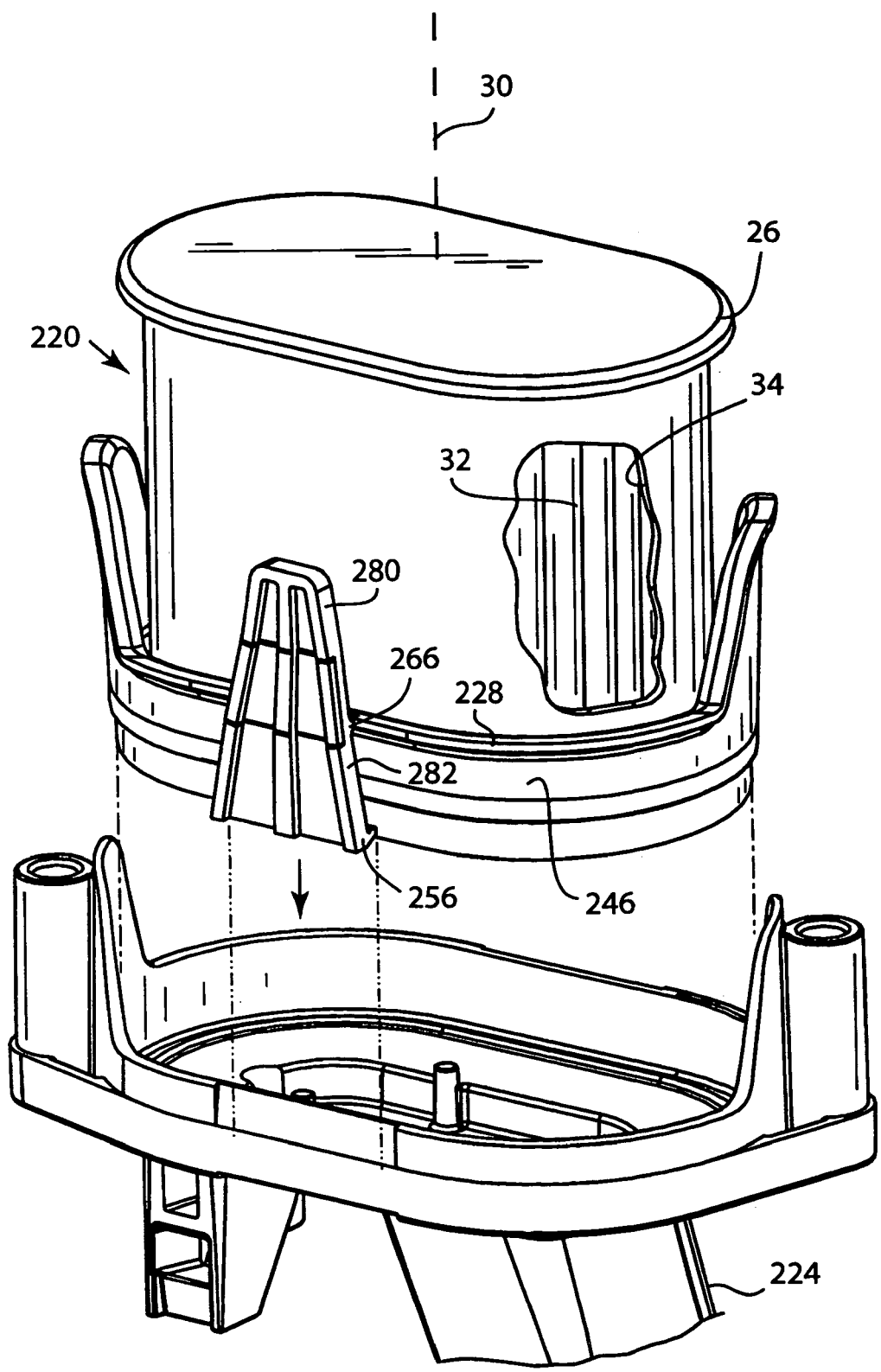
Figure 6:
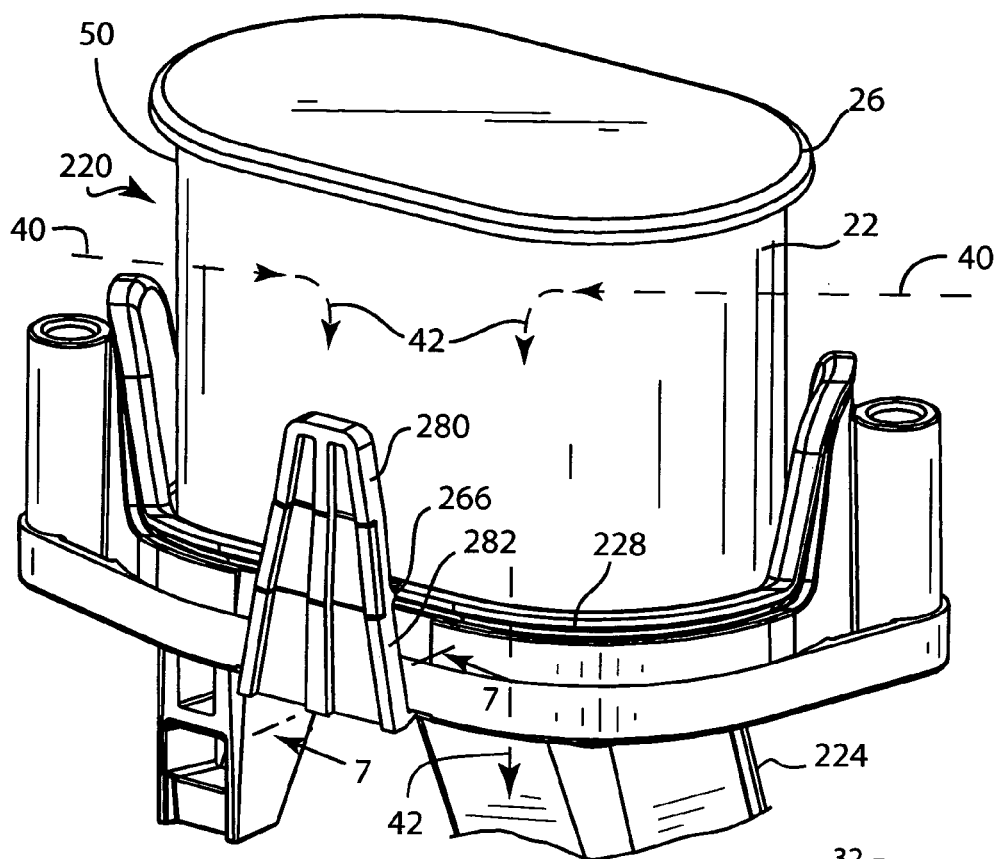
Figure 7:
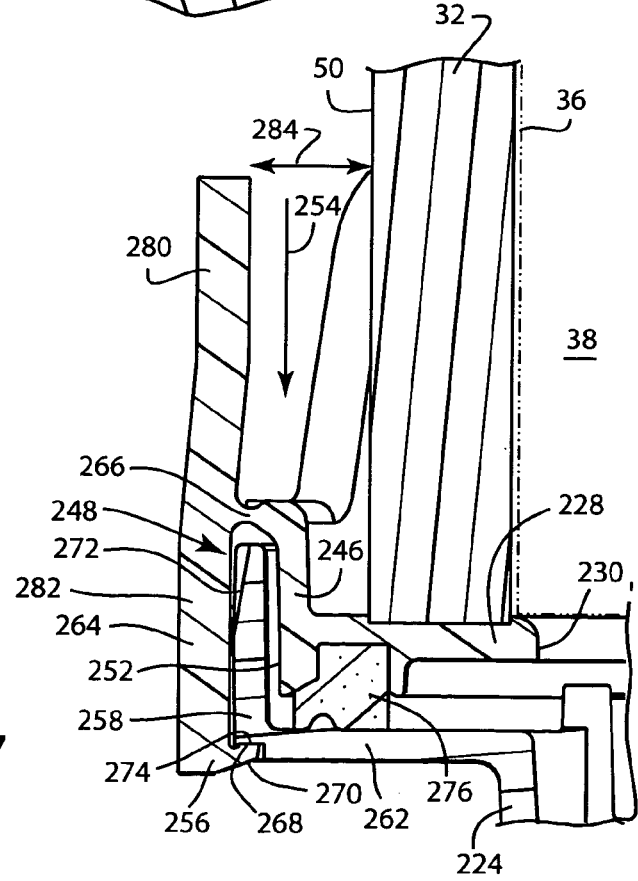

FIGS. 5-7 show a further embodiment, and use like reference numerals from above where appropriate to facilitate understanding. Filter 220 includes filter element 22 mounted to base 224. The filter element has first and second end caps 26 and 228 axially spaced along axis 30. End cap 228 has an axial flow opening 230 therethrough, FIG. 7. Filter media 32 extends axially between end caps 26 and 228, and extends in a closed-loop around a perimeter defining the noted hollow interior 38 communicating with axial flow opening 230. Fluid to be filtered flows laterally as shown at dashed arrows 40 through the filter media and axially as shown at dashed arrows 42 through hollow interior 38 and axial flow opening 230. Filter element 220 is mounted to base 224 solely by end cap 228, independently of end cap 26. A retainer, to be described, co-acts between end cap 228 and base 224 and applies axial retention force therebetween, independently of end cap 26, and independently of any cover forming a housing with base 224 and around the filter element.

End cap 228 extends laterally outwardly to an outer flange 246 laterally outward of filter media 32. A retainer 248 on the outer flange mounts the filter element at end cap 228 to base 224. Filter media 32 has the noted outer border 50, and outer flange 246 has a second outer border 252 laterally outward of outer border 50 and sufficiently laterally extended therefrom to accommodate the noted retainer along the lateral dimension between first and second outer borders 50 and 252. Retainer 248 mounts end cap 228 to base 224 in snap-fit relation with rectilinearly unidirectional axial insertion 254. Retainer 248 is provided by a hook 256 on one of end cap 228 and base 224, preferably end cap 228, and a catch 258 on the other of end cap 228 and base 224, preferably base 224 at laterally extended flange 262. Hook 256 is on a shank 264 which extends axially from a hinge 266 on toward and away from base 224 into and out of engagement with catch 258.

Hook 256 has oppositely axially facing surfaces 268 and 270. Catch 258 has oppositely axially facing surfaces 272 and 274. End cap 228 is mounted to base 224 with axial insertion motion 254, wherein surfaces 270 and 272 are camming surfaces and engage in camming relation to cam hook 256 laterally in a first direction (leftwardly in FIG. 7) until surface 268 moves axially past surface 274, whereupon hook 256 snaps back laterally in a second lateral direction (rightwardly in FIG. 7) opposite to the noted first lateral direction, such that surface 268 axially aligns with and axially engages surface 274 and prevents axial separation of end cap 228 from base 224, i.e. prevents upward axial movement of end cap 228 in FIG. 7. Surface 268 faces axially toward hinge 266. Surface 270 faces axially away from hinge 266. Hook 256 is manually laterally moveable in the noted first lateral direction (leftwardly in FIG. 7) about hinge 266 to move surface 268 out of axial alignment with and out of axial engagement with surface 274 to release hook 256 from catch 258 and permit axial separation of end cap 228 and base 224. Retainer 248 includes first and second legs 280 and 282 meeting at hinge 266 and extending oppositely axially therefrom. Leg 282 provides shank 264 extending from hinge 266 axially to hook 256. Legs 280 and 282 provide a teeter-totter having a fulcrum at hinge 266 such that manual engagement of and lateral movement of leg 280 in a rightward lateral direction in FIG. 7 moves leg 282 in a leftward lateral direction in FIG. 7 by pivoting about fulcrum 266, to release hook 256 from catch 258 and permit axial separation of end cap 228 from base 224. Leg 280 extends from hinge 266 axially toward end cap 26 and is spaced laterally outwardly of filter media 32 by a lateral gap 284 therebetween. To release hook 256, leg 280 is moved laterally inwardly toward filter media 32. Camming surface 272 faces axially toward hinge 266. Locking surface 274 of catch 258 faces axially away from hinge 266. Surface 272 faces axially toward end cap 26. Surface 274 faces axially away from end cap 26. End caps 26 and 228 and base 224 are preferably plastic, and hinge 266 is an integral part of end cap 228.

Figure 8:
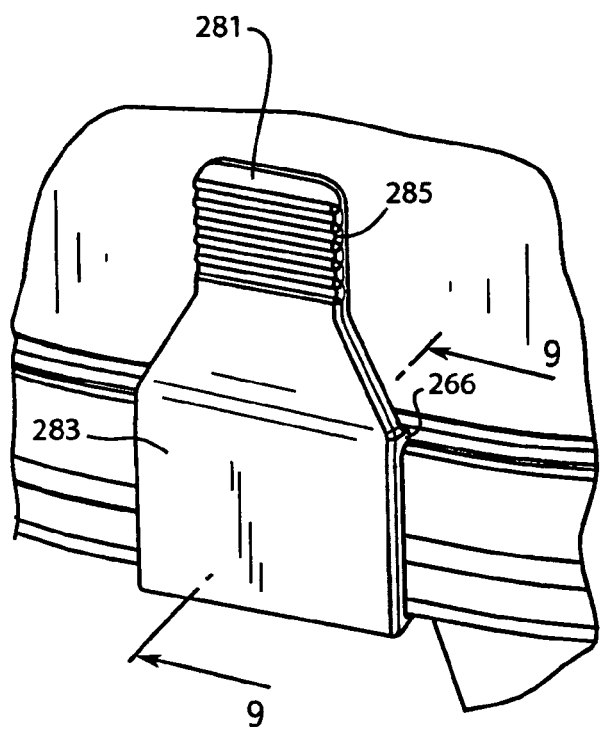
Figure 9:
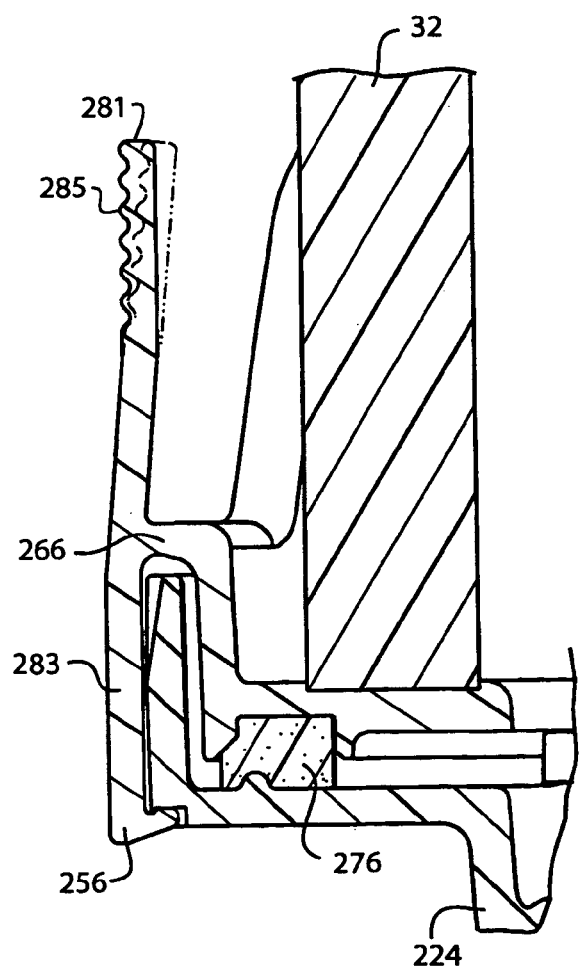

FIGS. 8 and 9 show another embodiment and use like reference numerals from above where appropriate to facilitate understanding. Legs 281 and 283 are configured aesthetically differently than legs 280 and 282, respectively of FIG. 7. Leg 281 further has a gripping portion 285 different than the outer surface of leg 280. In FIGS. 5-9, an axial sealing gasket 276 is provided between end cap 228 and base 224, for axial sealing, comparably to axial sealing gasket 76.

Figure 10:
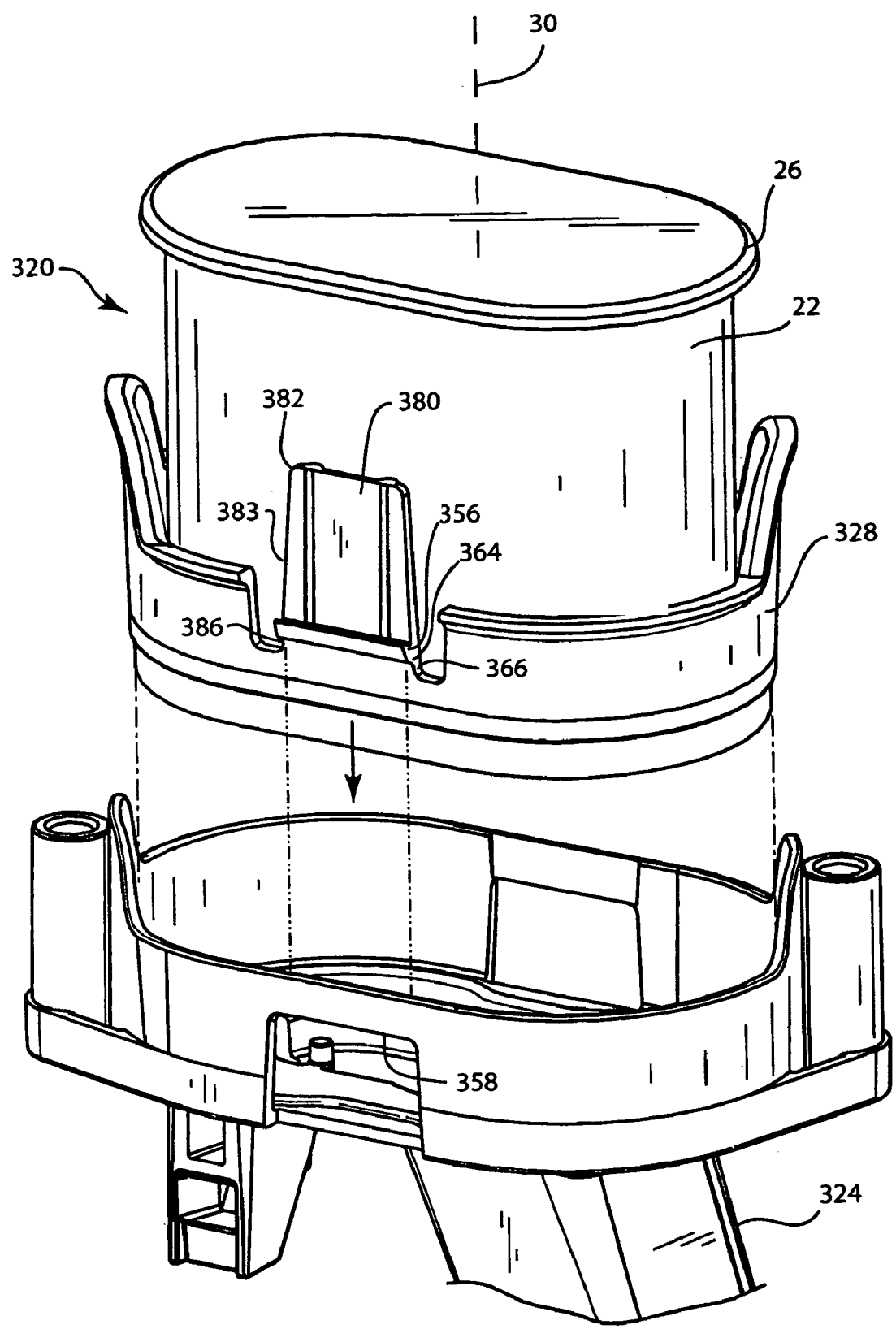
Figure 11:
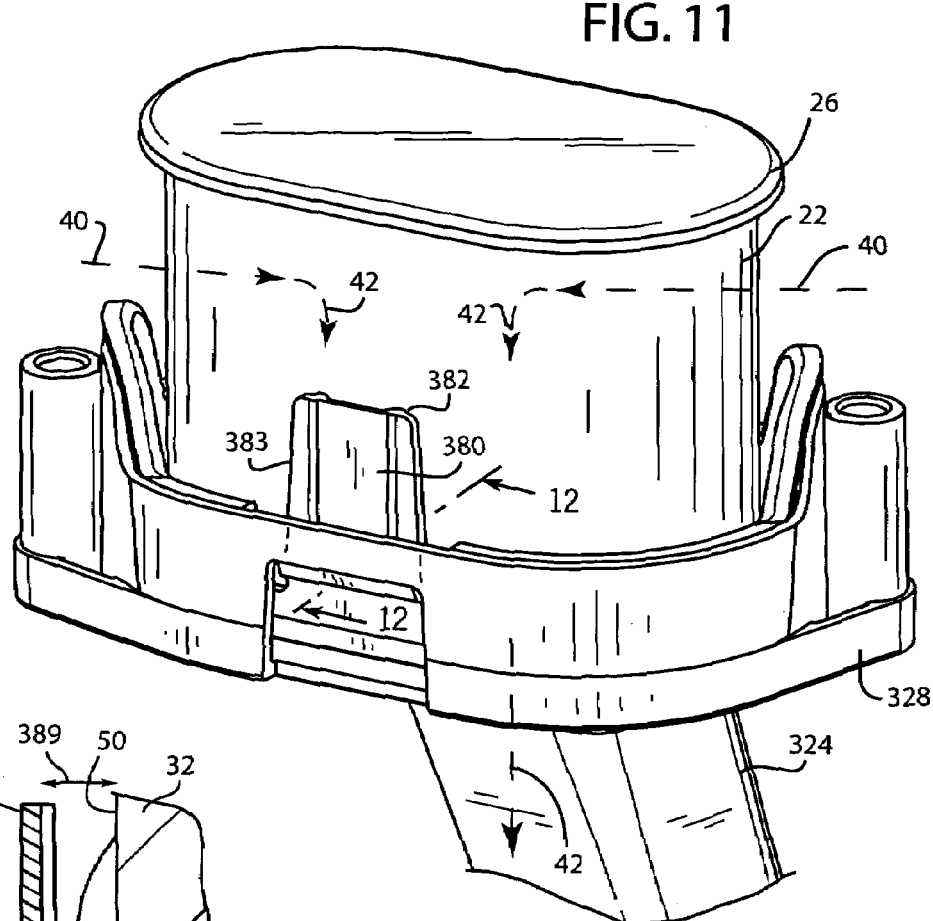
Figure 12:
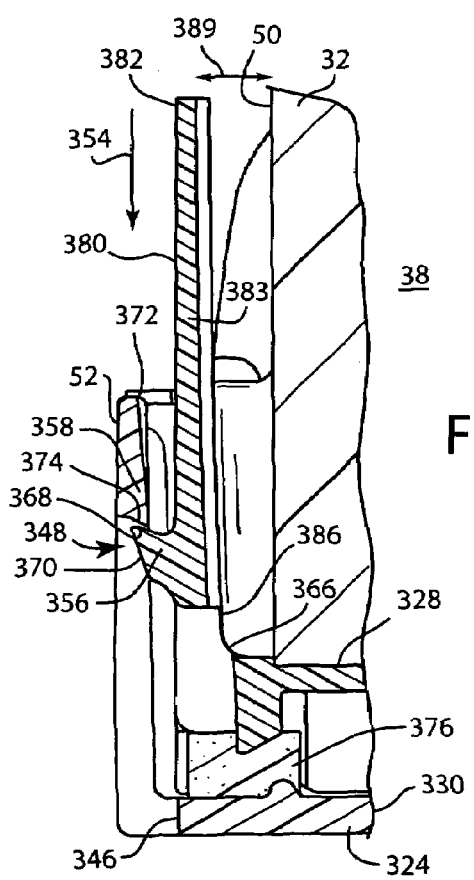

FIGS. 10-12 show another embodiment and use like reference numerals from above where appropriate to facilitate understanding. Filter 320 includes filter element 22 mounted to base 324. The filter element has first and second end caps 26 and 328 spaced axially along axis 30. End cap 328 has an axial flow opening 330 therethrough. Filter media 32 extends axially between end caps 26 and 328, and extends in a closed-loop around a perimeter defining the noted hollow interior 38 communicating with axial flow opening 330. Fluid to be filtered flows laterally through filter media 32 as shown at arrows 40, and axially as shown at arrows 42 through hollow interior 38 and axial flow opening 330. Filter element 22 is mounted to base 324 by end cap 328. Filter element 22 is mounted to base 324 solely by end cap 328, and independently of end cap 26. A retainer, to be described, co-acts between end cap 328 and base 324 and applies axial retention force therebetween, independently of end cap 26, and independently of any cover forming a housing with base 324 and around filter element 22.

End cap 328 extends laterally outwardly to an outer flange 346 for mounting filter element 22 at end cap 328 to base 324. Filter media 32 has the noted first outer border 50. Outer flange 346 has the noted second outer border 52 to laterally outward of outer border 50 and sufficiently laterally extended therefrom to accommodate retainer 348 along the lateral dimension between first and second outer borders 50 and 52. Retainer 348 mounts end cap 328 to base 324 in snap-fit relation with rectilinearly unidirectional axial insertion 354. Retainer 348 is provided by a hook 356 on one of end cap 328 and base 324, preferably end cap 328, and a catch 358 on the other of end cap 328 and base 324, preferably base 324. Hook 356 is on a shank 364 which extends axially from hinge 366. Hook 356 is laterally moveable about hinge 366 toward and away from the filter media, into and out of engagement with catch 358. In the preferred embodiment of FIGS. 10-12, hook 356 is laterally moveable about hinge 366 toward filter media 32 (rightwardly in FIG. 12) out of engagement with catch 358, and is laterally moveable about hinge 366 away from filter media 32 (leftwardly in FIG. 12) into engagement with catch 358.

Hook 356 has oppositely axially facing surfaces 368 and 370. Catch 358 has oppositely axially facing surfaces 372 and 374. End cap 328 is mounted to base 324 with axial insertion motion 354, wherein surfaces 370 and 372 are camming surfaces and engage in camming relation to cam hook 356 laterally in a first lateral direction (rightwardly in FIG. 12) until surface 368 moves axially past surface 374, whereupon hook 356 snaps back laterally in a second lateral direction (leftwardly in FIG. 12) opposite to the noted first lateral direction, such that surface 368 axially aligns with and axially engages surface 374 and prevents axial separation of end cap 328 and base 324, i.e. prevents axial upward movement of end cap 328 in FIG. 12. Surface 368 faces axially away from hinge 366. Surface 370 faces axially toward hinge 366. Hook 356 is manually laterally moveable in the noted first lateral direction (rightwardly in FIG. 12) about hinge 366, FIG. 10, to move surface 368 out of axial alignment with and out of axial engagement with surface 374 to release hook 356 from catch 358 and permit axial separation of end cap 328 and base 324. Retainer 348 is provided by an arm 380 extending axially from hinge 366 to a tab 382. Hook 356 is located axially between hinge 366 and tab 382, and extends laterally from arm 380. Arm 380 has a first segment 383 extending between hook 356 and tab 382, and a second segment 386 extending between hook 356 and hinge 366 and providing the noted shank 364. Manual engagement of the arm at tab 382 and lateral movement of the arm in the noted first lateral direction, namely laterally inwardly toward filter media 32 (rightwardly in FIG. 12) releases hook 356 from catch 358 and permits axial separation of end cap 328 from base 324. Segment 383 of arm 380 extends from hook 356 axially toward end cap 26 and is spaced laterally outwardly of filter media 32 by lateral gap 384 therebetween. Lateral movement of segment 383 and tab 382 inwardly toward filter media 32 releases hook 356 from catch 358. Surface 372 faces axially toward end cap 26. Surface 374 faces axially away from end cap 26. End caps 26 and 328 and base 324 are preferably plastic, and hinge 366 is an integral part of end cap 328. An axial sealing gasket 376 is provided between end cap 328 and base 324.

Axial sealing gaskets 76, 276, 376 are preferably resiliently compressible between the respective second end cap and the base and apply axial bias (axially upwardly in FIGS. 1-12) opposing the noted axial retention force provided by the noted retainer. The retainer provided by the noted respective hooks and catches mounts the second end cap to the base in snap-fit relation upon axial insertion of the filter element onto the base in a first axial direction (axially downwardly in FIGS. 1-12). The retainer releasably applies axial retention force between the second end cap and the base and prevents axial separation of the second end cap from the base in a second axial direction (axially upwardly in FIGS. 1-12). Resiliently compressible axial sealing gaskets 76, 276, 376 between the respective second end cap and the base apply axial bias in the noted second axial direction (axially upwardly in FIGS. 1-12). The noted upward axial bias provided by gaskets 76, 276, 376 enhances a continuous robust engagement of the snap-fit retainer, and improved retention of the filter element on the base in continuous biased engagement. The axial sealing gasket between the second end cap and the base applies an axial bias opposing the axial retention force applied by the retainer.

Present Application

FIG. 13 shows a filter 400 including a filter element 402 mounted to a base 404. Filter element 402 has first and second end caps 406 and 408 axially spaced along axis 410, FIGS. 13, 14. End cap 408 has an axial flow opening 412 therethrough, FIG. 15. The filter element includes filter media 414 extending axially between end caps 406 and 408 and extending in a closed-loop around a perimeter defining a hollow interior 416 communicating with axial flow opening 412. End caps 406 and 408 are preferably plastic, and filter media 414 is preferably embedded or potted therein in accordance with known embedding/dispensing technology. Filter media 414 may be pleated or a cellular sponge-like or Styrofoam type material or other materials as known. The filter may include an inner liner or screen or grid such as 418 and/or an outer liner (not shown) or may have neither an inner liner nor an outer liner. Fluid to be filtered flows laterally through the filter media as shown at dashed line arrows 420, and axially as shown at dashed line arrows 422 through hollow interior 416 and axial flow opening 412 into interior passage 424 in base 404 for delivery to the air intake of an internal combustion engine (not shown). Intake air at 420 may flow through an opening such as 420a in the base and/or may flow into the filter element at a downwardly tapered shroud skirt 420b of the base, though many other types of base arrangements may be used. The particular base 404 shown also includes wings 426 and 428 for mounting in the particular engine application and which may aid in desired air path guidance. Upper end cap 406 is a closed end cap spanning and closing hollow interior 416 of filter element 402. Filter element 402 is mounted to base 404 by lower end cap 408. The filter element is mounted to the base solely by lower end cap 408, as in the noted parent '144 application, and independently of upper end cap 406. A retention system is provided, co-acting between lower end cap 408 and base 404 and applies axial retention force therebetween independently of upper end cap 406, and independently of any cover forming a housing with the base and around the filter element. The filter element is mounted to the base by lower end cap 408 in rotational relationship, and is rotationally secured thereto, to be described.

Lower end cap 408 of filter element 402 has a plurality of ears 430, 432, 434, 436 extending laterally therefrom. Base 404 has a plurality of slots 440, 442, 444, 446. Each slot has a pocket such as 448, FIG. 13, extending arcuately therefrom adjacent the perimeter of the filter element. The filter has a first unlocked position, FIGS. 16, 19, with ears 430, 432, 434, 436 aligned with and axially received in respective slots. This is accomplished by axial downward movement of filter element 402 in FIG. 13 into base 404. The filter has a second locked position, FIGS. 18, 21, with end cap 408 rotated about axis 410, and the noted ears 430, 432, 434, 436 arcuately sliding into respective pockets and retained thereby to prevent axial withdrawal of filter element 402 from base 404. The noted arcuate sliding of the ears into the pockets is accomplished in FIG. 13 by clockwise rotation of end cap 408 about axis 410, which in FIGS. 19-21 is leftward movement of ear 436 from slot 442 into pocket 448, and which in FIGS. 16-18 is movement of ear 436 into the page. The ears and the pockets engage and apply axial retention force therebetween, preventing axial upward withdrawal of the filter element from the base in FIGS. 13, 17, 18, 20, 21. The ears and the pockets apply the axial retention force independently of upper end cap 406, and independently of any cover forming a housing with the base and around the filter element. A resiliently compressible axial sealing gasket 450 may be provided if desired between end cap 408 and base 404 and applying an axial bias opposing the noted axial retention force. A cover 452, FIG. 22, may optionally be mounted to upper end cap 406 independently of end cap 408, with the lower end cap 408 being mounted to base 404 independently of cover 452. The cover may have apertures or louvers such as 454 therethrough for supplying air to the filter element, and may have an upper tab or finger/thumb grip 456 for gripping by the user to facilitate the noted rotation.

The pockets such as 448 have arcuate tracks 458, FIG. 19, having leading edges 460 at the slots such as 442 and blocking axial withdrawal movement of the ears therepast, for example as shown in FIGS. 18 and 21. The ears have a first inner border such as 462, FIG. 16, at lower end cap 408, and have a second outer border 464 laterally outward of the filter media. The slots have an outer border such as 466 laterally outward of outer border 464 of the ears. Tracks 458 have an inner border 468 laterally inward of outer border 464 of the ears and laterally outward of inner border 462 of the ears and laterally outward of filter media 414.

Ears 430, 432, 434, 436 extend laterally outwardly from lower end cap 408 and also extend arcuately therealong from a leading end 470, FIG. 19, to a trailing end 472. The pockets have an entry end 474 at a respective slot such as 442. The entry end 474 of pocket 448 has a greater axial height than the leading end 470 of ear 436 to facilitate entry of leading end 470 of ear 436 into entry end 474 of pocket 448. The axial height of the ears varies from leading end 470 to trailing end 472. Leading end 470 has a smaller axial height than trailing end 472 to facilitate entry into pocket 448 upon rotation of end cap 408 about axis 410 clockwise in FIG. 13, which is leftward in FIGS. 19-21. This provides increased compressive axial engagement force upon continued rotation, FIGS. 20, 21, of end cap 408 as trailing end 472 of ear 436 engages and arcuately slides into pocket 448. The ears have an arcuately extending engagement surface such as 476 facing axially toward upper end cap 406 and spanning arcuately between a leading end 478 and a trailing end at 480. Engagement surface 476 varies between leading and trailing ends 478 and 480 such that engagement surface 476 at leading end 478 is axially spaced from upper end cap 406 by an axial distance which is greater than the axial spacing of engagement surface 476 at trailing end 480 from upper end cap 406, to facilitate entry of leading end 478 into pocket 448. Engagement surface 476 is tapered along a ramp from leading end 478 to trailing end 480 to provide increasing compressive axial engagement force upon continued rotation of end cap 408.

Further in the preferred embodiment, engagement surface 476 of the ears is additionally provided with a detent such as a bump or protrusion 482 formed therealong and extending upwardly therefrom. Pocket 448 at arcuate track 458 has a mating detent, for example a recess 484 formed therealong and engaging detent 482 of engagement surface 476 of ear 436, FIG. 21, upon rotation of end cap 408 to the noted second locked position, FIGS. 21, 18, and releasably constraining and holding end cap 408 in the noted locked position. Recess 484 is formed along the underside of the track at a triangular shaped brace or reinforcement 486, FIG. 18, formed between the top of track 458 and the sidewall of base 404.

It is recognized that various equivalents, alternatives and modifications are possible within the scope of the appended claims. The fluid to be filtered may flow laterally inwardly as shown at arrows 420, 40 through the filter media toward the noted hollow interior (outside-in filter), or alternatively the fluid to be filtered may flow laterally outwardly through the filter media away from the hollow interior (inside-out filter).

What is claimed is:

1. A filter comprising a filter element mounted to a base, said filter element comprising first and second end caps spaced axially along an axis, said second end cap having an axial flow opening therethrough, filter media extending axially between said end caps and extending in a closed-loop around a perimeter defining a hollow interior communicating with said axial flow opening, wherein fluid to be filtered flows laterally through said filter media and axially through said hollow interior and said axial flow opening, said filter element being mounted to said base by said second end cap in rotational relationship, and comprising a cover mounted to said first end cap independently of said second end cap, and wherein said second end cap is mounted to said base independently of said cover.

2. A filter comprising a filter element mounted to a base, said filter element comprising first and second end caps spaced axially along an axis, said second end cap having an axial flow opening therethrough, filter media extending axially between said end caps and extending in a closed-loop around a perimeter defining a hollow interior communicating with said axial flow opening, wherein fluid to be filtered flows laterally through said filter media and axially through said hollow interior and said axial flow opening, said filter element being mounted to said base by said second end cap in rotational relationship, said second end cap and said base are mounted to each other by a plurality of ears and slots, each slot having a pocket extending arcuately therefrom adjacent said perimeter, said filter having a first unlocked position with said ears axially aligned with and axially received in said slots, said filter having a second locked position with said second end cap rotated about said axis and said ears arcuately sliding into said pockets and retained thereby to prevent axial withdrawal of said filter element from said base, said pockets comprising arcuate tracks having leading edges at said slots and blocking axial withdrawal movement of said ears therepast, wherein said ears extend laterally outwardly from said second end cap and have an arcuately extending engagement surface facing axially toward said first end cap and spanning arcuately between a leading end and a trailing end, said engagement surface varying between said leading and trailing ends such that said engagement surface at said leading end is axially spaced from said first end cap by an axial distance which is greater than the axial spacing of said engagement surface at said trailing end from said first end cap, to facilitate entry of said leading end into said pocket.

3. The filter according to claim 2 wherein said engagement surface is tapered along a ramp from said leading end to said trailing end to provide increasing compressive axial engagement force upon said continued rotation of said second end cap.

\* \* \* \* \*